(12) United States Patent
Marui

(10) Patent No.: US 10,155,560 B2
(45) Date of Patent: Dec. 18, 2018

(54) STEERING APPARATUS

(71) Applicant: Shinji Marui, Kobe (JP)

(72) Inventor: Shinji Marui, Kobe (JP)

(*) Notice: Subject to any disclaimer, the term of this patent is extended or adjusted under 35 U.S.C. 154(b) by 376 days.

(21) Appl. No.: 14/815,097

(22) Filed: Jul. 31, 2015

(65) Prior Publication Data
US 2016/0031519 A1 Feb. 4, 2016

(30) Foreign Application Priority Data

Aug. 2, 2014 (JP) ................. 2014-158274

(51) Int. Cl.
| | | |
|---|---|---|
| *B62K 21/02* | (2006.01) | |
| *B62K 21/04* | (2006.01) | |
| *B62K 21/18* | (2006.01) | |
| *B62K 21/24* | (2006.01) | |

(52) U.S. Cl.
CPC .............. *B62K 21/18* (2013.01); *B62K 21/02* (2013.01); *B62K 21/04* (2013.01); *B62K 21/24* (2013.01)

(58) Field of Classification Search
CPC ........ B62K 21/02; B62K 21/04; B62K 21/12; B62K 21/18; B62K 21/24
See application file for complete search history.

(56) References Cited

U.S. PATENT DOCUMENTS

| | | | |
|---|---|---|---|
| 1,527,133 A | 2/1925 | Harley | |
| 1,830,916 A * | 11/1931 | Siebert | B62K 21/12 280/276 |
| 2,768,836 A * | 10/1956 | Hilber | B62K 25/08 280/276 |
| 3,295,863 A * | 1/1967 | Jaulmes | B62K 15/00 280/278 |
| 3,331,617 A * | 7/1967 | Jacoby | B62K 21/12 280/279 |

(Continued)

FOREIGN PATENT DOCUMENTS

| | | | | |
|---|---|---|---|---|
| CH | 2426042 A1 * | 3/2012 | ............. | B62J 9/003 |
| DE | 494664 C * | 4/1930 | ............. | B62K 21/18 |

(Continued)

OTHER PUBLICATIONS

Extended European Search Report dated Jan. 13, 2016 from corresponding European Patent Application No. 15179553.1, 8 pages.

(Continued)

*Primary Examiner* — Joseph M Rocca
*Assistant Examiner* — Maurice L Williams
(74) *Attorney, Agent, or Firm* — Innovation Capital Law Group, LLP; Vic Lin

(57) ABSTRACT

A handle structure is provided that maintains strength and rigidity of a steering handle bar or object, is lightweight, and does not require a steering handle bar with a large rise (height). A steering column is rotatably supported by a head tube, while left and right fork legs are attached along a left and a right side of the steering column. The axle of the front wheel is rotatably supported by a dropout at a bottom end of the left and right fork legs. The top edges of the left and right fork legs adequately projects upward from the top end of the steering column. One steering handle bar is is supported by split couplers or connectors coupled to each top fork portion of the left and right front legs.

21 Claims, 11 Drawing Sheets

(56) References Cited

U.S. PATENT DOCUMENTS

| | | | |
|---|---|---|---|
| 3,354,975 A | 11/1967 | Stuart | |
| 3,366,193 A * | 1/1968 | Campbell | B62K 11/04 180/227 |
| 3,513,926 A * | 5/1970 | Paget, Jr. | B62K 15/006 180/208 |
| 3,620,547 A * | 11/1971 | Vaverek | B62K 3/002 280/87.042 |
| 3,623,749 A * | 11/1971 | Jensen | B62K 15/006 280/278 |
| 3,811,705 A * | 5/1974 | D'Ambra | B62K 21/02 280/276 |
| 4,111,447 A * | 9/1978 | Ishida | B62K 15/008 280/261 |
| 4,147,371 A | 4/1979 | Morita et al. | |
| 4,268,055 A | 5/1981 | Bell | |
| 4,274,647 A | 6/1981 | Drake | |
| 4,284,288 A * | 8/1981 | Fulton | B62K 15/006 280/278 |
| 4,379,566 A * | 4/1983 | Titcomb | B62K 21/18 280/251 |
| 4,512,592 A * | 4/1985 | Yoshioka | B62K 21/08 280/277 |
| 4,542,910 A * | 9/1985 | Watanabe | B62K 21/02 280/276 |
| 4,611,684 A * | 9/1986 | Geschwender | B62K 15/006 180/223 |
| 4,691,930 A * | 9/1987 | Samuel | B62K 9/00 280/278 |
| 4,705,285 A * | 11/1987 | Yoshida | B62K 25/08 280/277 |
| 5,257,553 A | 11/1993 | Cheng | |
| 5,855,388 A | 1/1999 | Brewer | |
| 6,017,047 A * | 1/2000 | Hoose | B60G 3/01 280/276 |
| 6,176,503 B1 | 1/2001 | George | |
| 6,694,842 B1 * | 2/2004 | Chen | B62K 9/00 280/279 |
| 6,712,541 B1 * | 3/2004 | Henricksen | B62K 21/04 403/286 |
| 7,118,302 B1 * | 10/2006 | Durham | B62K 21/04 280/276 |
| 7,163,224 B1 * | 1/2007 | Song | B62K 11/14 280/276 |
| 7,909,345 B1 * | 3/2011 | Olson | B62K 21/04 280/276 |
| 8,720,928 B2 * | 5/2014 | Delpit | B62K 21/22 280/276 |
| 8,783,704 B2 * | 7/2014 | Richards | B62K 25/04 280/275 |
| 2004/0031349 A1 * | 2/2004 | Chen | B62K 9/02 74/551.3 |
| 2005/0116442 A1 * | 6/2005 | Law | B62K 11/14 280/279 |
| 2005/0211010 A1 * | 9/2005 | Zimmerman | B62K 11/14 74/551.1 |
| 2005/0257978 A1 * | 11/2005 | Sigfrid | B62K 11/14 180/219 |
| 2008/0258424 A1 | 10/2008 | Paul | |
| 2009/0007714 A1 * | 1/2009 | Carlini | B62K 11/14 74/492 |
| 2010/0186542 A1 * | 7/2010 | Hashimoto | B21D 53/86 74/551.1 |
| 2011/0121538 A1 * | 5/2011 | Giroux | B62K 19/32 280/280 |
| 2014/0165773 A1 * | 6/2014 | Montero Basqueseaux | B62K 15/00 74/551.3 |

FOREIGN PATENT DOCUMENTS

| | | | | |
|---|---|---|---|---|
| DE | 102008024604 A1 * | 12/2009 | | B62K 21/04 |
| FR | 1479509 A * | 5/1967 | | B62K 21/02 |
| GB | 243292 A * | 11/1925 | | B62K 21/02 |
| GB | 722457 | 1/1955 | | |
| GB | 722457 A * | 1/1955 | | B62K 21/18 |
| JP | 1515581977 | 11/1977 | | |
| JP | 616086 A | 1/1986 | | |
| JP | S616086 A | 1/1986 | | |
| JP | 61135880 A | 6/1986 | | |
| JP | H11321759 A | 11/1999 | | |
| JP | 2005247296 A | 9/2005 | | |
| JP | 2013068310 A * | 4/2013 | | B62K 25/08 |
| WO | WO 8302598 A1 * | 8/1983 | | B62K 3/002 |

OTHER PUBLICATIONS

International Search Report & Written Opinion dated May 30, 2017 from related International PCT Application No. PCT/IB2017/000123.

* cited by examiner

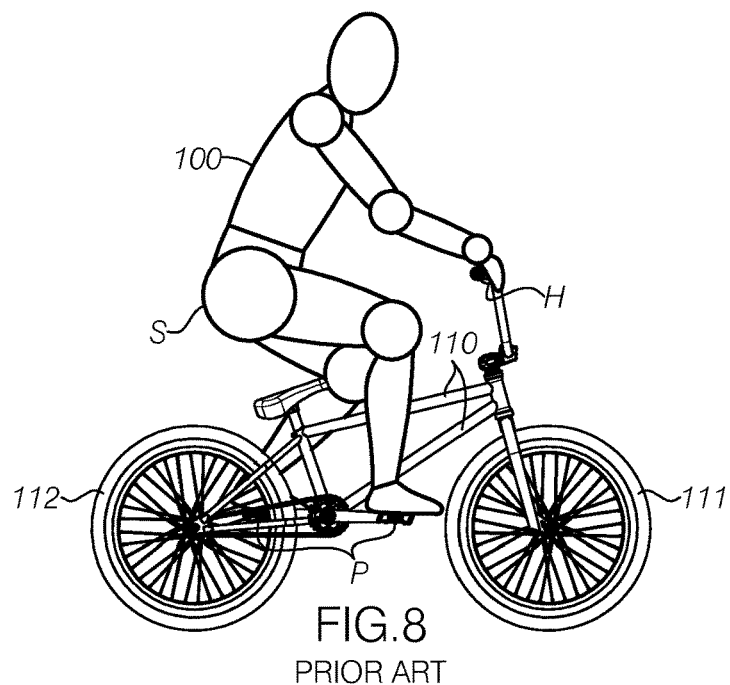
FIG.8
PRIOR ART
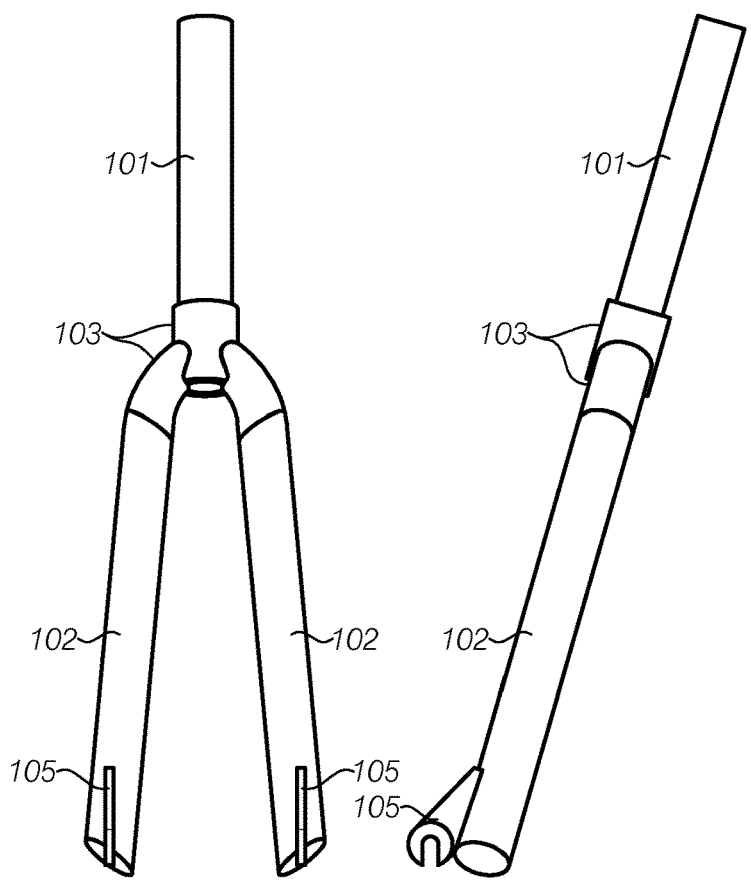
FIG.9A
PRIOR ART
FIG.9B
PRIOR ART

STEERING APPARATUS

TECHNICAL FIELD

The present invention relates to fork leg apparatuses or handle structures that couple a steering handle bar or other objects to a wheel.

DESCRIPTION OF PRIOR ART AND RELATED INFORMATION

Normally, a rider (person 100) is in contact with a bicycle at three sites of a handle H, a pedal P, and a saddle S. (See FIG. 8) When a position of any one of these three sites (H, P, and S) is moved, an unreasonable riding posture is created. So, it is basically difficult to move the positions of the handle, pedal and saddle. However, there is a certain degree of freedom in which each of these components can be arranged, in a range where the positions of the three locations (H, P, and S) do not move.

For example, among a set of constituent components of a steering handle bar 107, a stem 106, a steering column 101, and fork legs 102 (see FIG. 10), there is no restriction that an existing design must be followed in which any component must cover a height from a front wheel 111 up to the bar gripped by the rider.

A large rise (height) R is given to the conventional handle bar 107 depicted in FIG. 11 by disposing an upward bent portion 109. Steering handle bars with a large rise (height) have a problem of bringing about an increase in weight in order to maintain strength and rigidity.

Conversely, a steering assembly is known whose height can be adjusted by manually moving the steering handle bar, and that rotates, without using a steering handle bar with a large rise (height).

According to the steering assembly disclosed in JP Publication 2005-247296, a stem attached to a steering column that is inside of a head tube disposed above a fork leg, that extends in a vertical direction can move in an axis direction of the head tube and can adjust a height by manually moving the steering handle bar.

Before describing the steering apparatus pursuant to the present invention, a prior art handle structure will be described with reference to FIGS. 9-12.

The two left and right fork legs 102 having a structure that steers while supporting an axle of the front wheel 111 are joined together by a fork crown 103 at a top portion of the front wheel 111, in a conventional handle structure. Also, the top portion of the fork crown 103 is linked to one steering column 101. Also, a top end of the steering column 101 is linked to the handle bar 107 by a coupling component of a stem 106. Also, the steering column 101 is rotatably supported on a front frame 110 by a head tube 113 on the front frame 110 (composed of the head tube 113, top tube 114, and a down tube 115). A dropout 105 positioned at a bottom end of the fork leg 102 supports the front wheel 111 axle.

FIG. 11 shows one example of a shape of a steering bar. The steering handle bar 107 is bent as described above; an upward bend 109 ensures a large rise (height) R.

FIG. 12 shows one example of a shape of a conventional stem 106. The constitution of the stem is separated into two parts (30 and 31). One part is portion 130 that is anchored to the steering column (not shown in the drawing). The other part is portion 131 that is anchored to the steering handle bar (not shown in the drawing). These two portions (130, 131) have a clamp structure. The steering column (not shown in the drawing) that is inserted through a penetration hole 134 is anchored by tightening two members 132 by passing a bolt from bolt hole 136. Also, the steering handle bar (not shown in the drawing) that is inserted through penetration holes 133 is anchored by tightening two members (137, 138) by passing bolts through bolt holes 135.

Normally, the two portions (130, 131) which are constituent elements of the stem are formed into one body as shown in FIG. 12.

BRIEF SUMMARY OF THE INVENTION

Problems to be Resolved by the Invention

As described above, steering handle bars with a large rise (height) have a problem of bringing about an increase in weight in order to maintain strength and rigidity.

Also, a handle structure cannot be found that extends left and right fork legs, namely, the front fork, in the vertical direction such that it ensures adequate rise (height) of the steering handle bar.

In light of this, an object of the present invention is to provide a lightweight steering apparatus, or handle structure, that maintains strength and rigidity without using steering handle bars with a large rise (height).

Solutions to the Problem

To resolve the problem, the preferred apparatus is equipped with a steering column rotatably supported by a head tube, and left and right fork legs attached at a left and right of the steering column, which rotatably supports the front wheel axle. Also, a top end of the left and right fork legs adequately projects upward from a top end of the steering column. A handle bar or other object can be coupled to a pair of split couplers attached to the top fork portions of the left and right fork legs.

With the conventional handle structure, a steering handle bar with a large rise (height) is attached to the top end of the steering column by the left and right fork legs and a fork crown. With the preferred apparatus according to the present invention, two fork legs disposed side-by-side at the left and right of the steering column extend an adequate degree or height upward from the top end of the steering column. A handle bar is coupled to the top end of the fork legs. The degree that the fork legs extend (a degree that they project) can be adjusted to be large; a notable vertical height difference can be imparted between a joint position with the steering column, and the handle bar.

With the preferred apparatus according to the present invention, an object, such as a steering handle bar, is coupled to the top fork portions of the two fork legs attached extending along a left and right side of the steering column. In other words, the handle bar is supported by a pair of front fork legs extending vertically from the axle all the way to the steering mechanism. Also, by extending the front forks and adequately projecting them upward from the top end of the steering column preferably in a non-converging manner, a steering handle bar with a large rise (height) is unnecessary. A steering handle bar with a small or no rise (height) can be used.

If a stem and handle bar are used, in the apparatus equipped with the steering column rotatably supported by a head tube, and left and right front legs extending along the left and right sides of the steering column, the preferred apparatus is characterized by the top edges of the left and right fork legs adequately projecting upward from the top end of the steering column, and one steering handle bar being attached to link a split coupler attached to each top fork portion. In one embodiment, a split coupler may be coupled to each top fork portion anywhere along its length, including the top edge of the left and right fork legs.

Here, the split coupler may preferably be attached at each top edge or face of the right and left fork legs. This is the part or connector that joins the right and left fork legs and one steering handle bar.

Also, in the preferred apparatus, it is acceptable to attach the legs side by side along the left and right side of the steering column by the right and left fork legs penetrating the pair of upper and lower fork crowns, and the steering column penetrating a center of the pair of upper and lower fork crowns.

A pair of upper and lower fork crowns is disposed near the top end and near the bottom end of the steering column. The left and right fork legs are inserted into penetration holes disposed at left and right sides of each fork crown to anchor the left and right fork legs. Also, the steering column is inserted into penetration holes disposed at the center of the pair of upper and lower fork crowns, and the steering column and the left and fork legs are integrated in a juxtaposed configuration.

Also, in the preferred apparatus, a split coupler, or stem attached to the top edge of each of the left and right fork legs (to distinguish this from a stem in the conventional parts, this is called a split coupler in these specifications) may be integrally attached to the fork legs by welding, gluing or casting, and passed through left and right penetration holes in the pair of upper and lower fork crowns.

With this constitution, convenience is increased for assembly and disassembly work.

Also, in the preferred apparatus, a dropout passes through the left and right penetration holes in the pair of upper and lower fork crowns.

With this constitution, convenience is increased for assembly and disassembly work.

With the preferred apparatus, the strength and rigidity of the steering handle bar is maintained and made lightweight without using a steering handle bar with a large rise (height).

BRIEF DESCRIPTION OF THE DRAWINGS

FIG. 6A-2 is a top perspective view of the preferred apparatus;
FIG. 6B-1 is a rear perspective view of the preferred apparatus;
FIG. 6B-2 is a top perspective view of the preferred apparatus;
FIG. 6C-1 is a rear perspective view of the preferred apparatus;
FIG. 6C-2 is a top perspective view of the preferred apparatus;
FIG. 8 is a schematic view of a rider on a bicycle;
FIG. 9A is a front view of a conventional prior art handle structure;
FIG. 9B is a side view of a conventional prior art handle structure; (1) is a front view; (2) is a side view.

DETAILED DESCRIPTION OF THE PREFERRED EMBODIMENTS

One example of a preferred embodiment of a steering apparatus according to the present invention will now be described with reference to the drawings. A scope of the present invention is not limited to the following embodiment or drawings; various forms or adaptations are possible within the scope of the technical idea of the present invention.

Figures 1A, 1B:
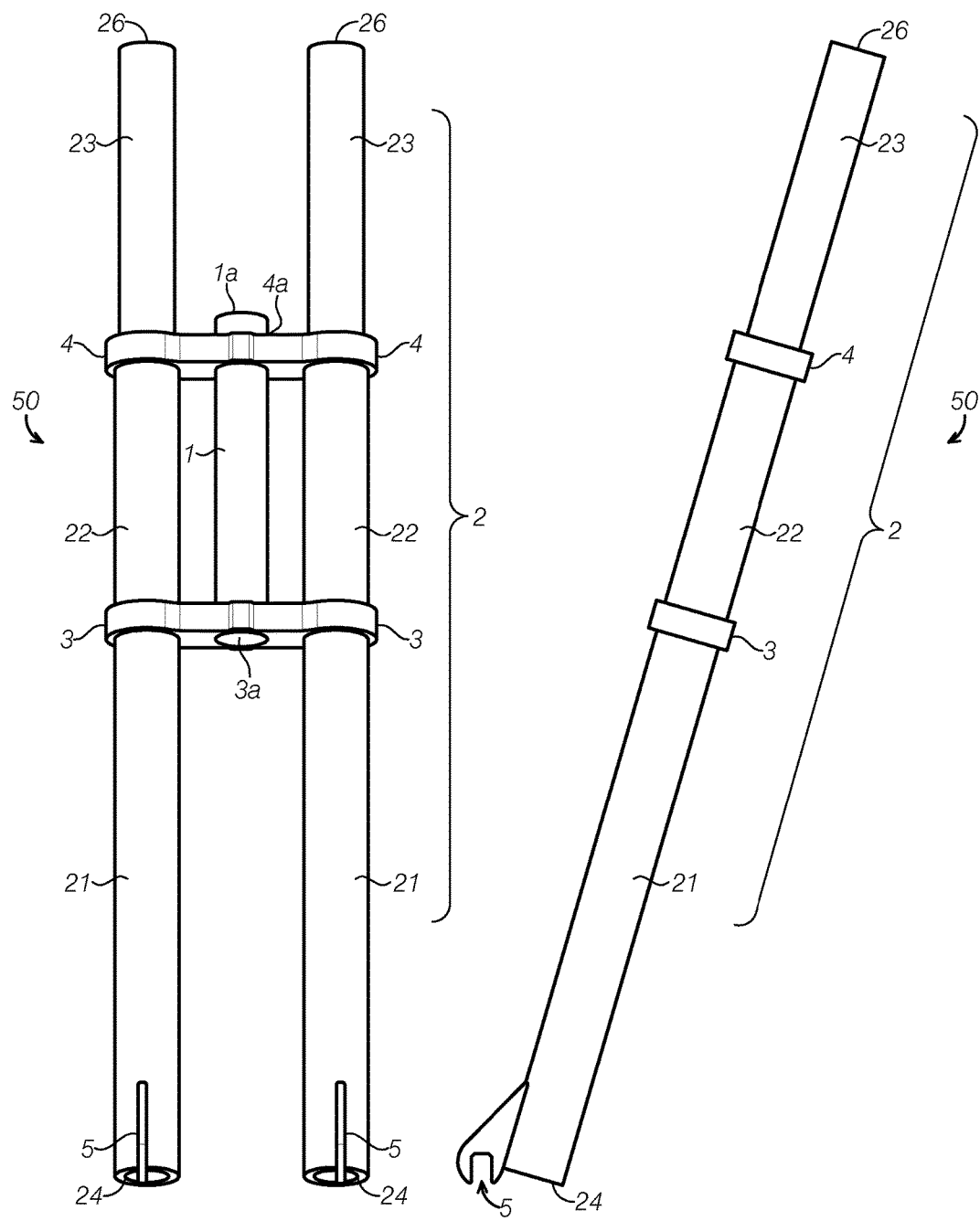
FIG. 1A is a front view of a preferred embodiment of a steering apparatus.
FIG. 1B is a side view of the preferred apparatus.

One preferred embodiment of a steering apparatus, or handle structure, 50 pursuant to the present invention will now be described with reference to FIGS. 1A, 1B and 2. The steering apparatus, or simply apparatus, 50 is preferably configured for use in connection with bicycles, motorcycles or any other vehicles requiring steering.

A preferred embodiment of the apparatus 50 comprises a steering column 1 rotatably supported by and within the head tube 13 of the front frame 10, and left and right fork legs 2 extending vertically along a left and right side of the steering column 1. The two fork legs 2 preferably extend from bottom to top in a non-converging manner and may extend in parallel in a preferred embodiment. The axle of the front wheel 11 is rotatably supported by a dropout, or notch, 5 at a bottom end of the left and right fork legs 2. A top fork portion 23 of each fork leg 2 adequately projects upward from a position of a top end 1a of the steering column 1 all the way up to a top face or top edge 26. In the preferred embodiment, the top face 26 of each fork leg 2 is spaced approximately at least 50 mm from the top end 1a of the steering column, and preferably in the range of 150 mm-160 mm, and all the way up 200 mm. Therefore, it will be appreciated that a vertical distance in the range of 20 mm to 200 m is provided between the top of the steering column 1 and the bottom of the mounted object. In a preferred embodiment, the apparatus 50 provides a vertical space of at least 20 mm between a bottom of the mounted object to the top end of the steering column 1. For example, where the mounted object comprises brackets attached to the top fork portions 23, a bottom of the bracket may be positioned beneath the top edges 26 of the fork legs 2. Therefore, while the top edges 26 of the fork legs 2 are at least 50 mm higher than the top end of the steering column 1, the vertical spacing between the top end of the steering column 1 to the bottom surface of the mounted object may be less (e.g., at least 20 mm) due to the possibility that the bottom surface of the mounted object may be positioned beneath the top edges 26 of the fork legs 2.

The preferred apparatus 50 comprises two split couplers 6a, 6b, one 6a, 6b attached to each top fork portion 23 of the right and left fork legs 2. An object, such as a steering handle bar 7, is attached to join together the two split couplers (6a, 6b).

The apparatus 50 may also comprise a variety of other connectors (e.g., clamps, clips, brackets, etc.) that may be coupled to anywhere along the length of each top fork portion 23 to vary the desired height of the object supported by the fork legs 2. Since the apparatus 50 preferably comprises two separate fork legs 2 that do not intersect, the preferred embodiment comprises a pair of connectors, one for each fork leg, that will join the fork legs 2 to the object supported preferably at or adjacent to the top of the fork legs 2.

The object supported at the top of the upwardly extending pair of fork legs 2 may comprise a variety of different steering mechanisms, carriers, connectors or other structures. As examples and not by way of limitation, the object may comprise a case for holding and displaying electronic devices such as smartphones.

The right and left fork legs 2 are inserted through penetration holes, or openings, disposed at right and left end portions of a lower fork crown 3 that is positioned adjacent to a bottom end, and through an upper fork crown 4 positioned adjacent to a top end. By inserting the steering column 1 through penetration holes (3a, 4a) disposed at a center, above and below the pair of fork crowns (3, 4), the fork legs 2 are stably attached along the left and right sides of the steering column 1.

The fork legs 2 define a shape that extends upwardly in a non-converging manner compared to the converging fork legs 102 of the prior art shown in FIG. 9. Therefore, the apparatus 50 comprises a pair of fork legs 2 that extend vertically from the axle all the way up to the steering mechanism or other object supported at the top edges 26 of the legs, while maintaining a horizontal distance or lateral spacing therebetween throughout the length of the fork legs 2. The horizontal spacing between the pair of fork legs 2 may vary from bottom to top so long as no portion of one leg 2 touches any portion of the other leg 2. The pair of fork legs 2 may be generally parallel to each other or slightly tilted toward or away from each other. In the preferred embodiment, the fork legs 2 do not converge such that no portion of the right fork leg touches any portion of the left fork leg.

Each fork leg 2 comprises three portions: a bottom fork portion 21, a middle fork portion 22, and a top fork portion 23. Preferably, these three fork portions 21, 22, and 23 are integrated in each fork leg 2. In other words, they are composed as one monolithic pipe. The bottom fork portions 21 replace the prior art fork legs 102. The middle fork portions 22 are linked or coupled to the steering column 1 by the lower fork crown 3 and the upper fork crown 4. The top fork portions 23 maintain a notable height difference between the steering handle bar 7 and a joint position of the upper fork crown 4 and the steering column 1.

Figure 3:
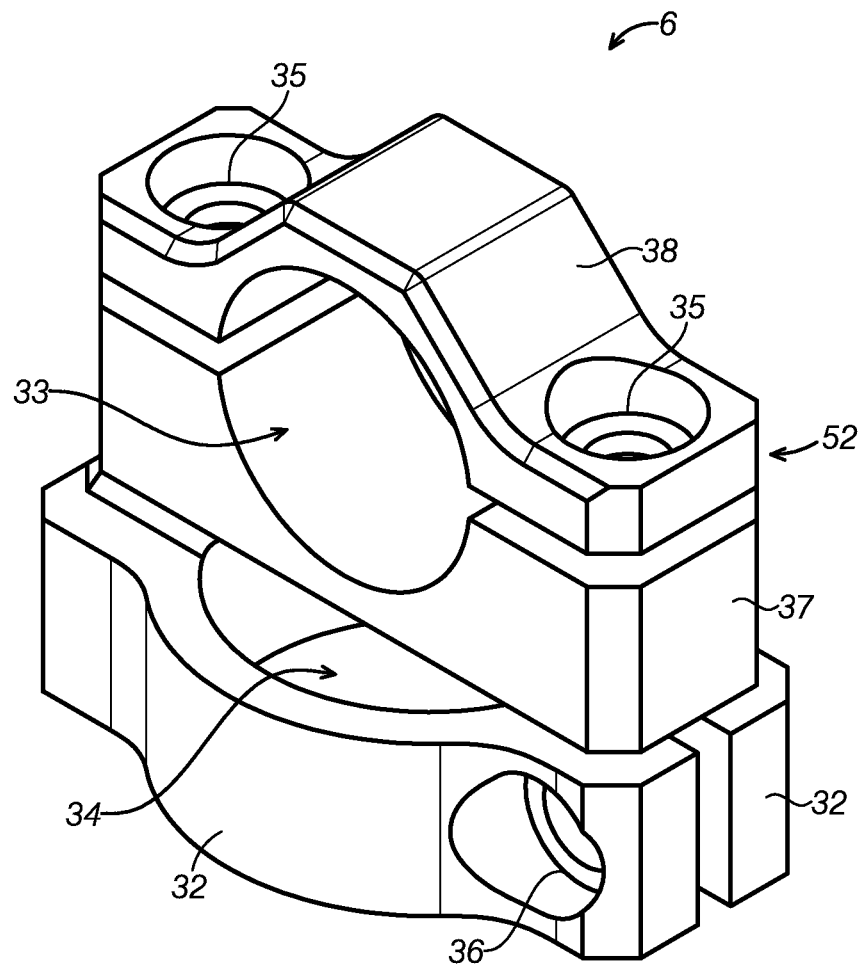
FIG. 3 is a perspective view of a preferred split coupler.
Figure 4A:
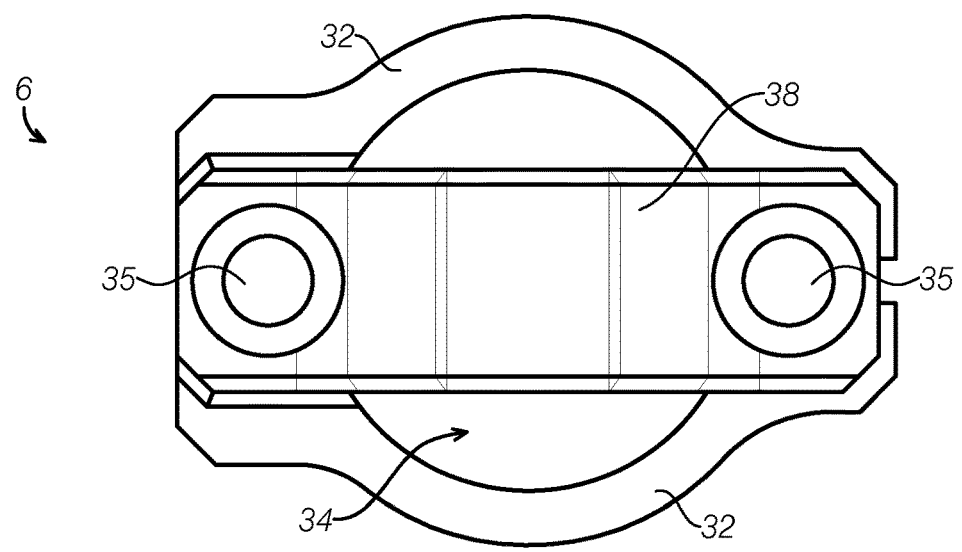
FIG. 4A is a top view of the preferred split coupler.
Figure 4B:
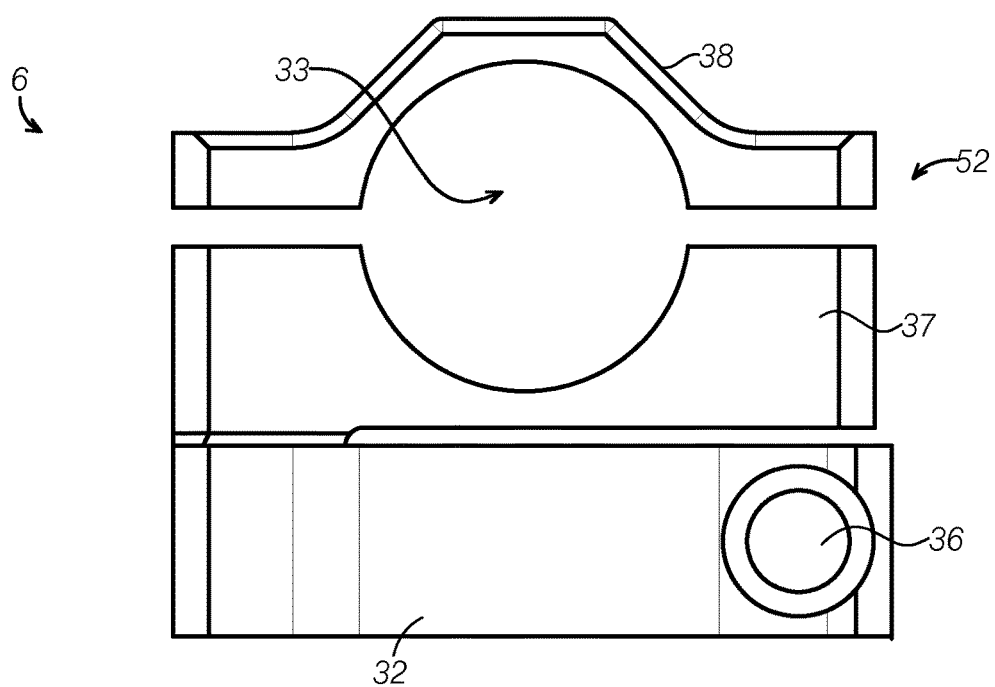
FIG. 4B is a front view of the preferred split coupler.

A preferred split coupler 6 suitably used for the apparatus 50 pursuant to the present invention will now be described with reference to FIGS. 3, 4A and 4B. FIG. 3 is a perspective view of the split coupler 6. FIG. 4A is a plan view of the split coupler 6. FIG. 4B is a front view of the split coupler 6.

The split coupler 6 shown in FIG. 3 comprises a base 32 and a clamp 52. In the preferred embodiment, the base 32 is anchored to a top fork portion (not shown in the drawing) of the fork leg, preferably at or adjacent to the top edge. The split coupler 6 also comprises a clamp with clamp portions 37, 38 that are anchored to the steering handle bar (not shown in the drawing). A top fork portion (not shown in the drawing) of the fork leg that is inserted through a base penetration hole 34 is anchored by tightening the pair of base members 32, 32 with a bolt inserted through a bolt hole 36 which may be internally threaded. The steering handle bar (not shown in the drawing) that is inserted through a clamp penetration hole 33 is anchored by tightening the two clamp members 37, 38 by inserting bolts through bolt holes 35 which may be internally threaded.

Figure 12:
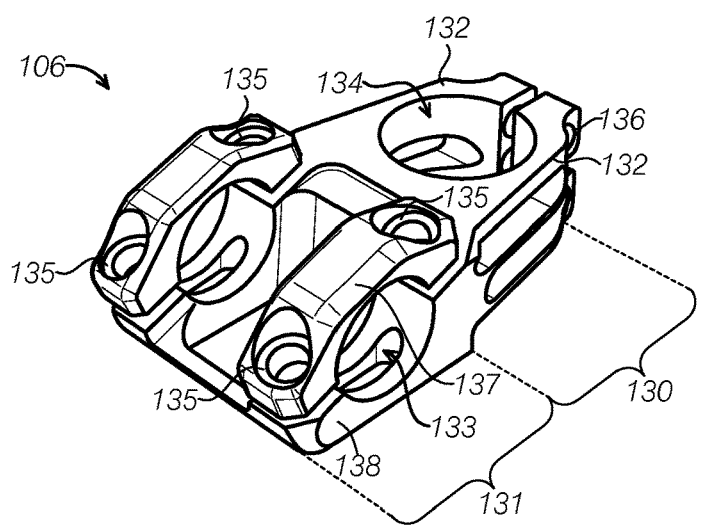
FIG. 12 is explanatory view of a conventional prior art stem structure.

The preferred split coupler 6 shown in FIG. 3 is different from the conventional stem structure depicted in FIG. 12. Clamp portions 37, 38 are disposed directly above the base penetration hole 34 defined by the base 32. For that reason, the steering handle bar (not shown in the drawing) that is inserted through the clamp penetration hole 33 is positioned directly above the top edge of each fork leg that is inserted through the base penetration hole 34 as shown more clearly in FIGS. 2 and 5.

Figure 5:
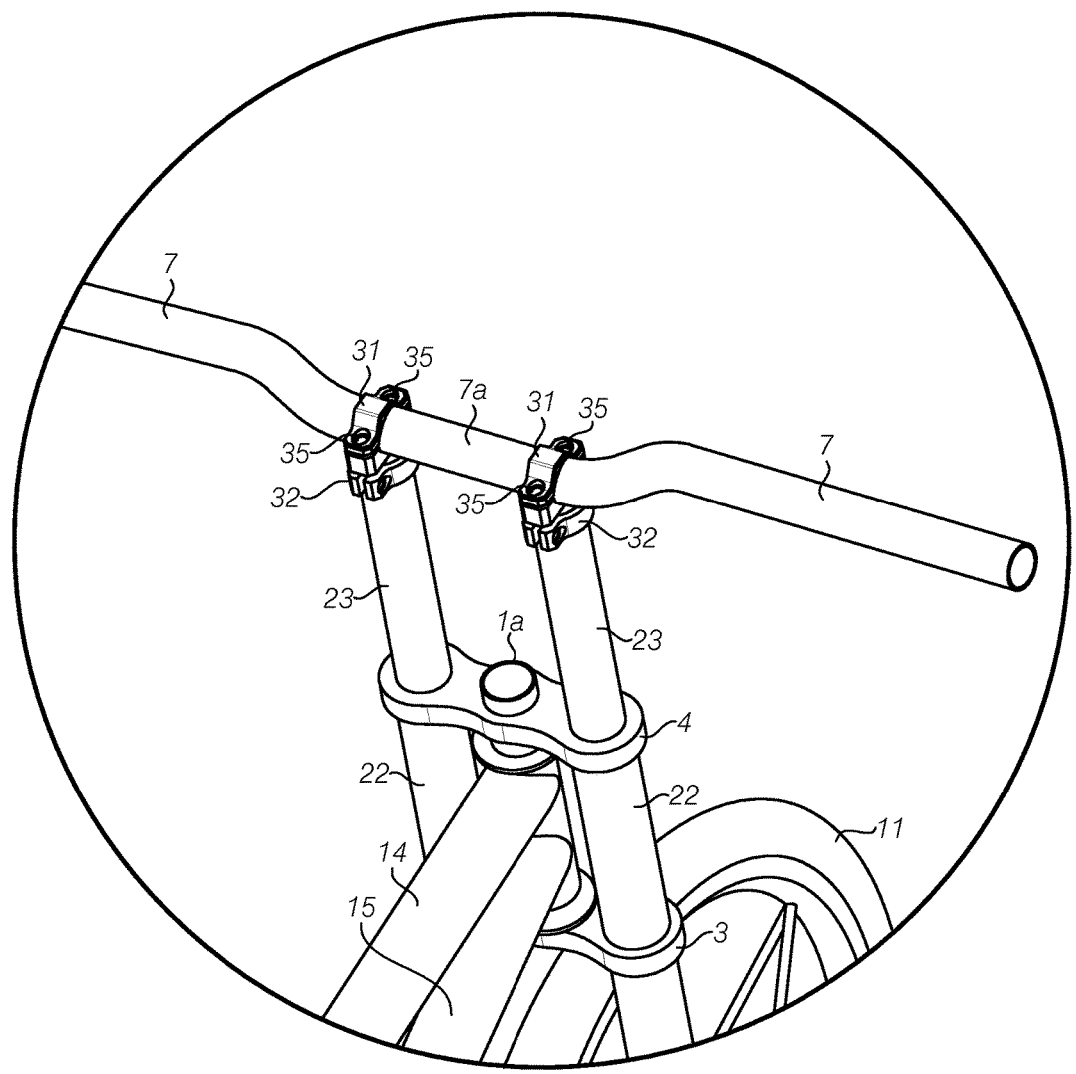
FIG. 5 is a rear perspective view of the preferred apparatus.

FIG. 5 shows the pair of fork legs and steering handle bar seen from the saddle.

The left and right top fork portions 23 pass through penetration holes disposed at left and right sides of the fork crown 4, and project upward from positions of the top end 1a of the steering column. The split coupler base 32 described above is anchored to the top fork portions of the left and right top fork portions 23. Also, the top clamp portion 38 is disposed directly above the base 32, and the steering handle bar 7 is anchored directly above the top edge of each top fork leg portion 23.

Figures 1, 6A:
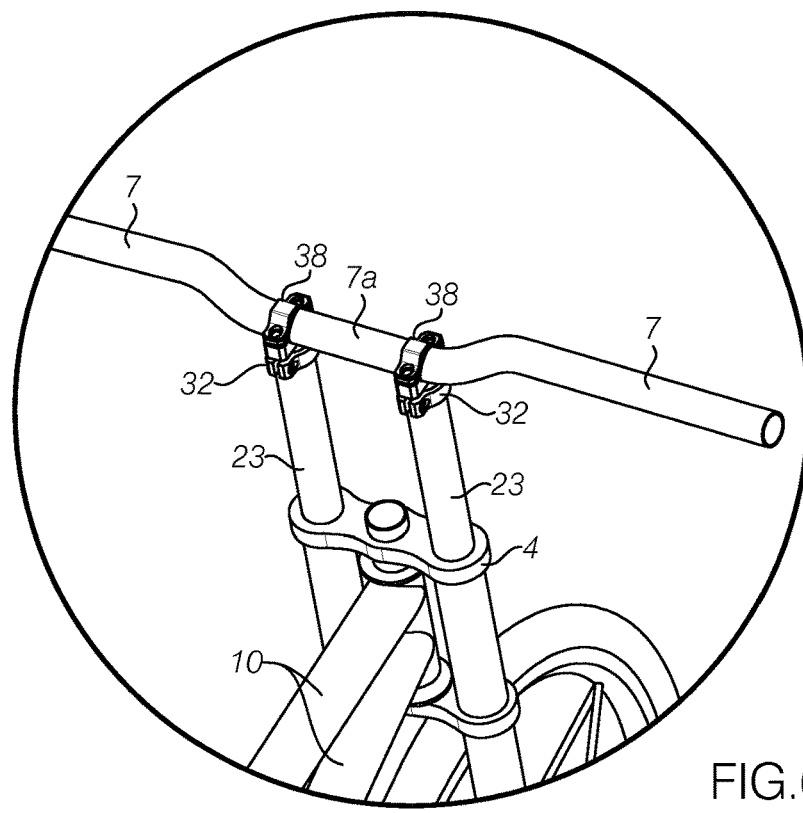
FIG. 6A-1 is a rear perspective view of the preferred apparatus.
Figures 2, 6A:
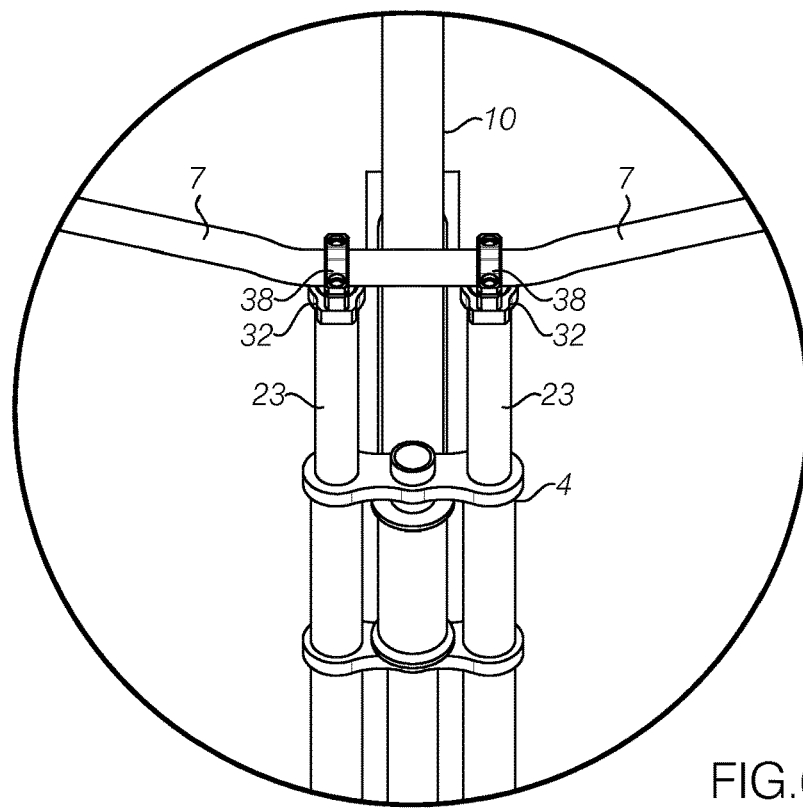

Next, a relationship of attachment positions of the top fork portion 23 and the steering handle bar 7 will now be described with reference to FIG. 6. FIG. 6A-1 and 6A-2 show the apparatus described thus far. There is a notable vertical height difference between the upper fork crown 4 and the pair of split couplers 6. The steering handle bar 7 is anchored directly above the top fork portions of the two top fork portions 23. In other words, the steering handle bar 7 is anchored directly above the top fork portion, without an offset to the front or to the rear from a center of the top fork portions 23.

Figure 2:
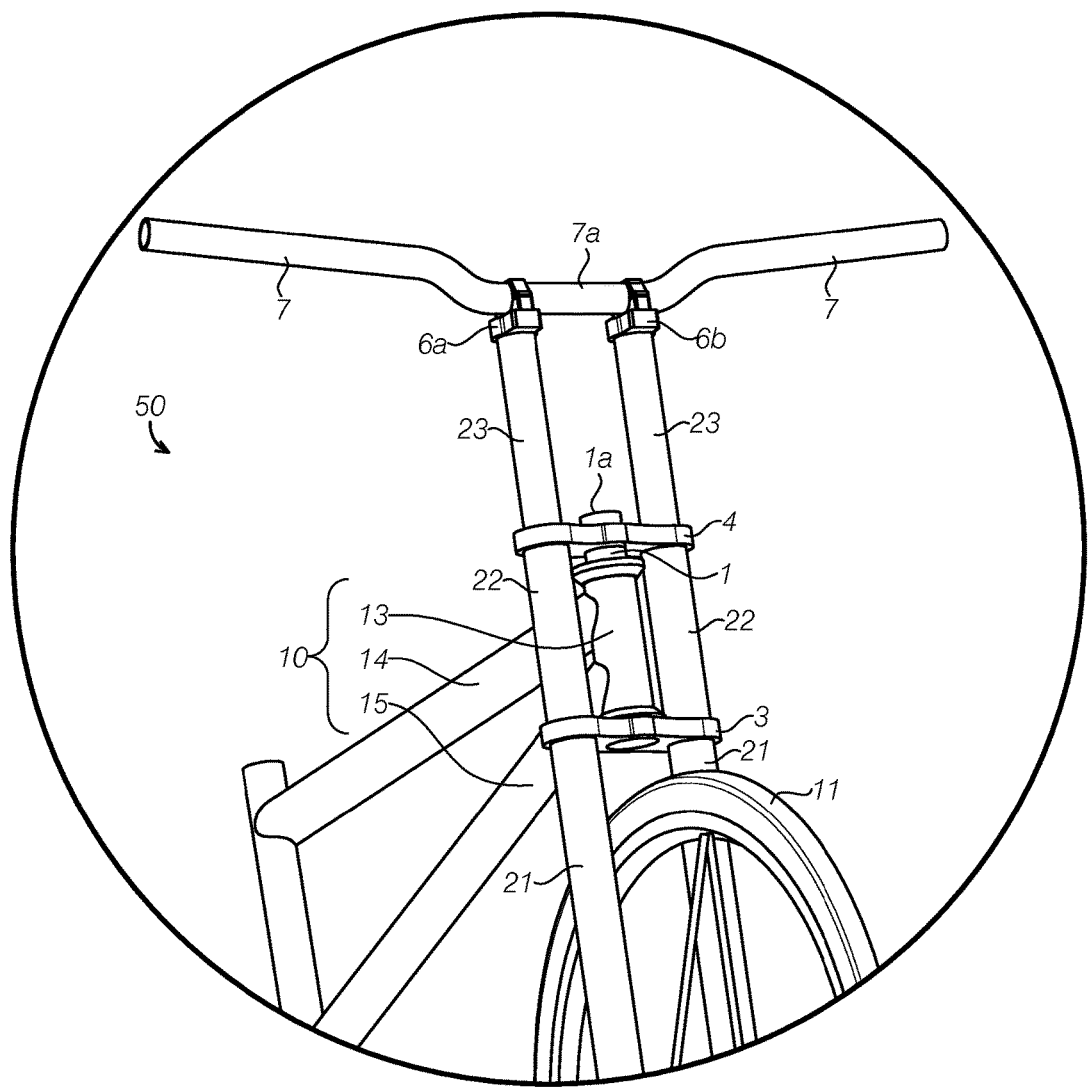
FIG. 2 is a front perspective view of the preferred apparatus.
Figures 1, 6B:
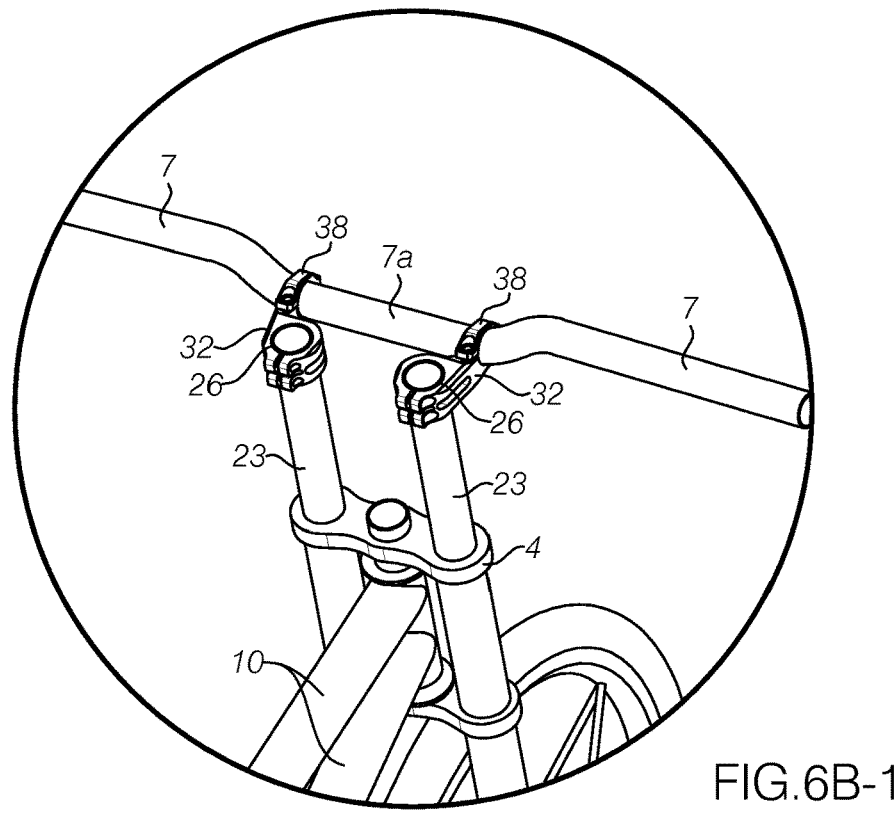
Figures 2, 6B:
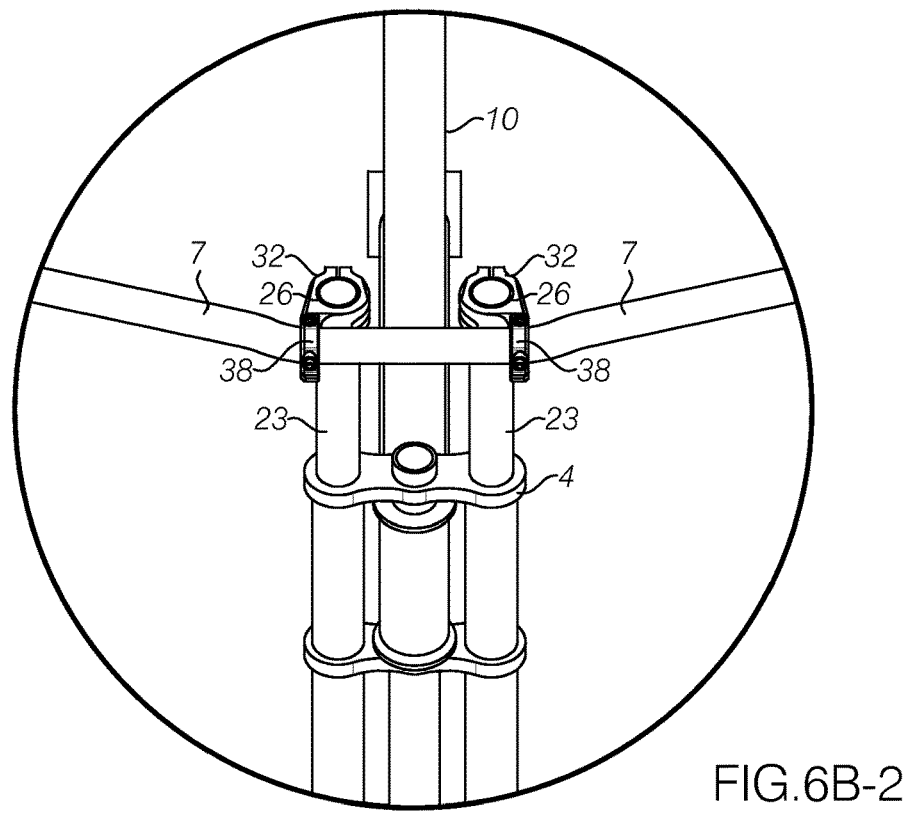

Conversely, with the apparatus shown in FIGS. 6B-1 and 6B-2, the clamp portions 38 are disposed outside and not directly above the clamp base 32 of the split coupler. Also, the steering handle bar 7 is anchored offset to the front from a center of the top edge of the fork leg 23.

Figures 1, 6C:
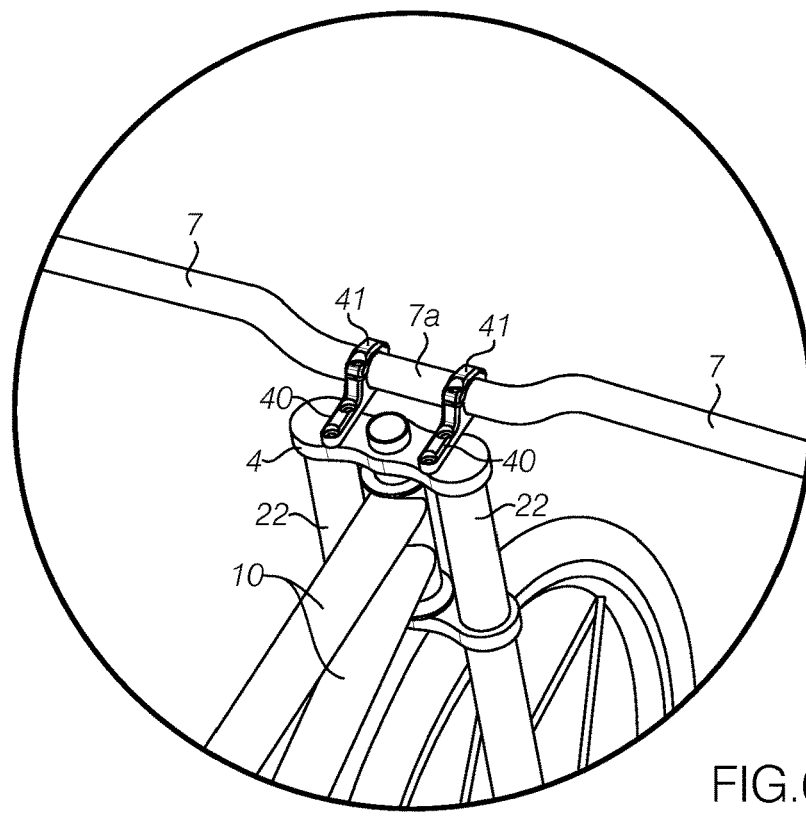
Figures 2, 6C:
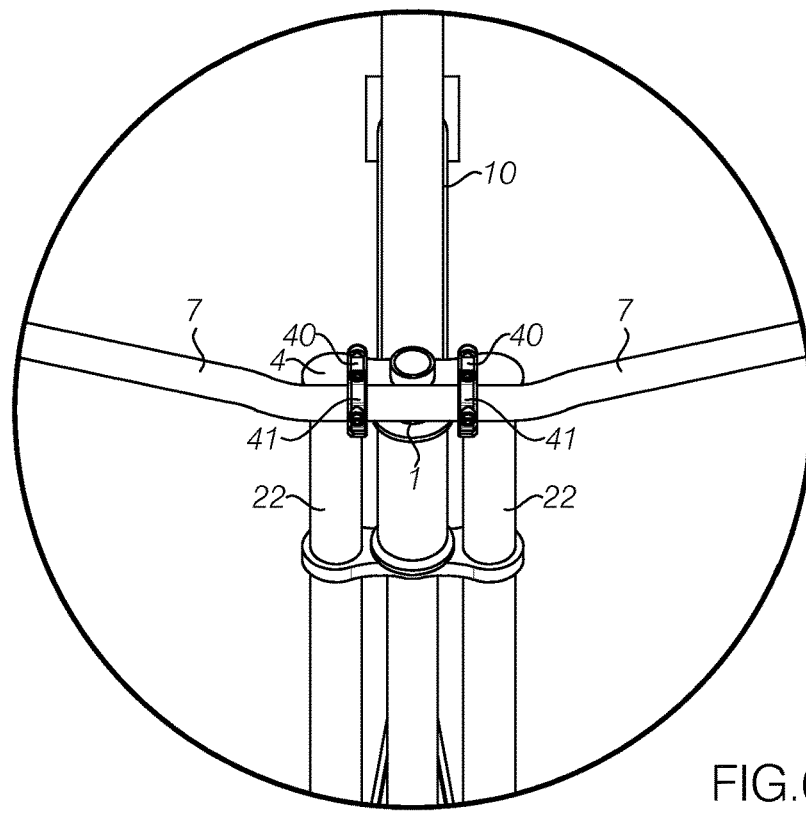

In an alternative embodiment of a handle structure shown in FIGS. 6C-1 and 6C-2, there are no top fork portions 23 as in the previous preferred embodiment. A pair of split couplers 40, 41 are attached directly to the top ends of the top fork crown 4. Each split coupler 43 comprises a base 40 coupled to the top fork crown and a clamp 41 receiving the handle bar 7. There is no vertical height difference between the top fork crown 4 and the split couplers 43. In the case of FIGS. 6C-1 and 6C-2, the clamps 41 are disposed offset to the front from the center of the top end face of the middle fork portions 22, and the steering handle bar 7 is anchored.

Figure 7A:
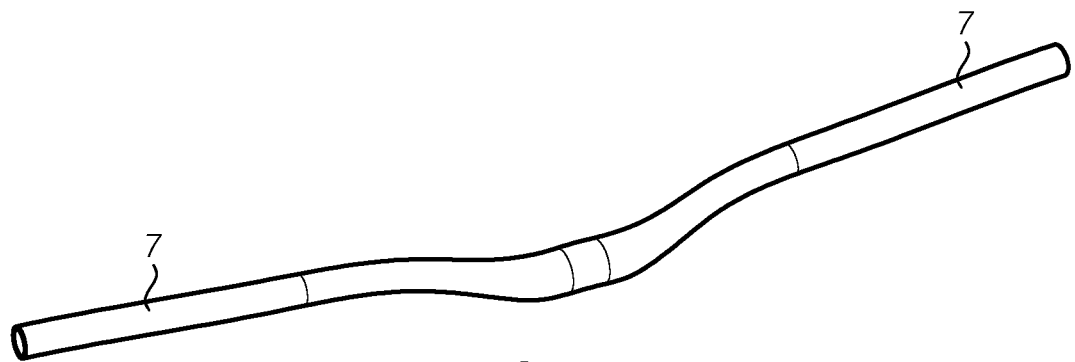
FIG. 7A is a perspective view of the preferred handle bar.
Figure 7B:
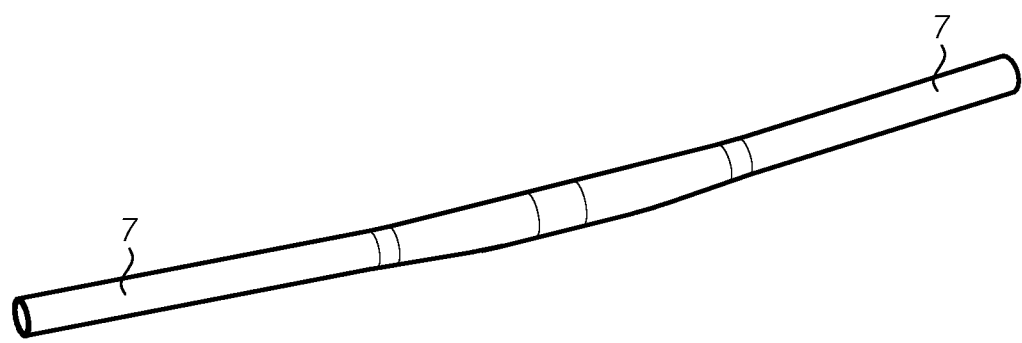
FIG. 7B is a top view of the preferred handle bar.
Figure 10:
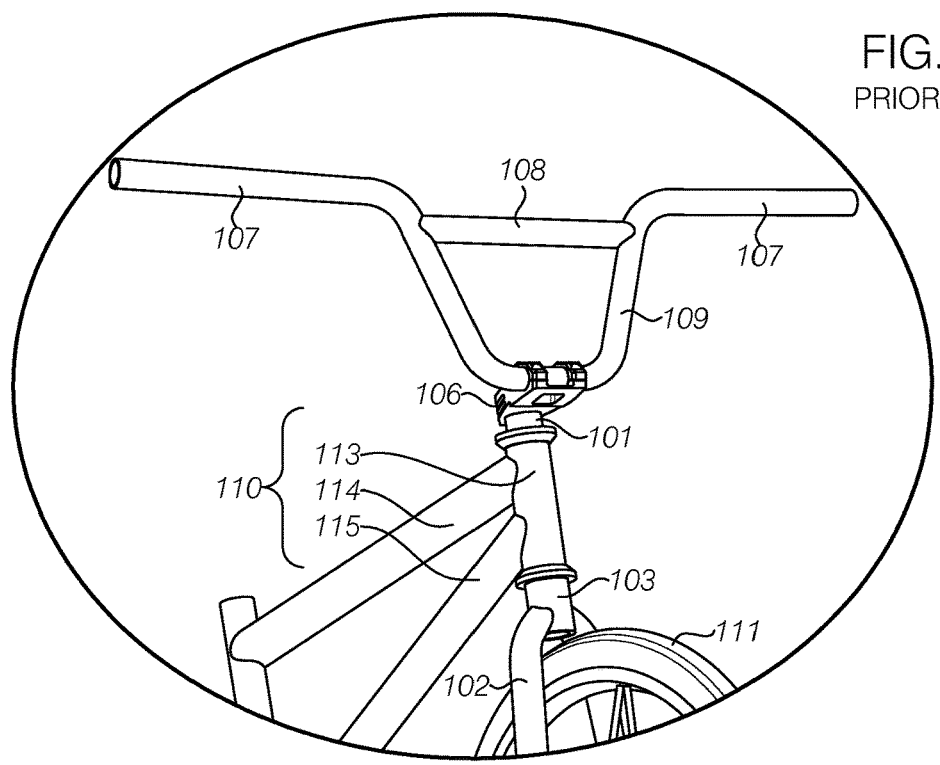
FIG. 10 is explanatory view 2 of the conventional prior art handle structure.
Figure 11:
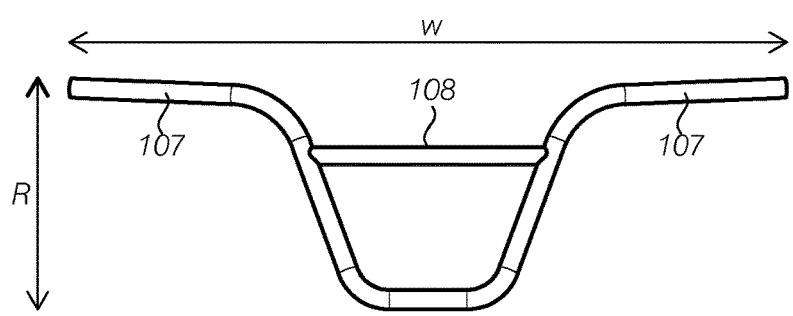
FIG. 11 is an explanatory view of the conventional handle bar prior art.

FIG. 7A shows an example of a handle bar. FIG. 7-A shows a steering handle bar 7 that has a slight rise (height). FIG. 7-B shows a steering handle bar 7 with no rise (height). Either type of steering handle bar can be used. The top edges of the left and right fork legs adequately project upward from the top end of the steering column. The split couplers attached at each top edge of the left and right fork legs anchor the steering handle bar, so a rise (height) is not required for the steering handle bar, and a stronger, flat steering handle bar can be used.

In the illustrated embodiment employing a pair of split couplers 6a, 6b, each split coupler 6a, 6b is preferably attached to a top edge of each top fork portion. However, it is to be expressly understood that the split couplers 6a, 6b or other suitable connectors may be attached to any part of each top fork portion 23 to provide the desired height of the object, such as a steering handle bar, supported by the fork legs.

The present invention is useful as a steering apparatus for sporting usages, particularly for bicycles, kick scooters, motorcycles and other motorized two-wheeled vehicles, and any other sport or exercise equipment using handles or handlebars.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements. The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An apparatus comprising:
a steering column pivotally supported by a head tube;
a left fork leg extending along a left side of the steering column;
a right fork leg extending along a right side of the steering column;
a wheel attachment portion disposed at a first bottom fork portion of the left fork leg and a second bottom fork portion of the right fork leg, wherein
a first top fork portion of the left fork leg and a second top fork portion of the right fork leg each terminate above a top end of the steering column;
the left fork leg and the right fork leg each formed as a single monolithic structure between the wheel attachment portion and the first and second top fork portions; and
connectors clamped onto each of the first and second top fork portions are configured to support a steering handle bar.

2. The apparatus according to claim 1, wherein a top edge of each top fork portion of the left and right fork legs is positioned at least 50 mm in a vertical direction from a top end of the steering column.

3. The apparatus according to claim 2, further comprising the steering handle bar and wherein a bottom of the steering handle bar is positioned at least 20 mm from the top end of the steering column.

4. The apparatus according to claim 1, wherein the steering handle bar is anchored directly above a top fork portion, without an offset to a front or to a rear from a center of the top fork portion of the left and right front forks.

5. The apparatus according to claim 1, wherein the connector includes a first split coupler is anchored directly above the right top fork portion and a second split coupler is anchored directly above the left top fork portion, without an offset to a left or to a right from a center of the top fork portion of the left and right front forks.

6. The apparatus according to claim 5, wherein first and second split couplers attached to the top fork portions of the left and right fork legs are integrally attached to the fork legs by welding, gluing or casting.

7. The apparatus according to claim 1, wherein the handle bar comprises a flat bar.

8. The apparatus according to claim 1, further comprising a dropout disposed at each of the first bottom fork portion and the second bottom fork portion.

9. The apparatus according to claim 1, wherein a shape of the left and right fork legs comprises a straight line.

10. The apparatus according to claim 1, wherein
the right and left fork legs penetrate a pair of upper and lower fork crowns; and
wherein the steering column penetrates a center of the pair of upper and lower fork crowns.

11. An apparatus comprising:
a steering column pivotally supported by a head tube and including a top end;
left and right fork legs extending along a left and right side of the steering column, wherein a first top fork portion of the left fork leg and a second top fork portion of the right fork leg terminate above the top end of the steering column and do not converge;
a wheel attachment portion disposed at a first bottom fork portion of the left fork leg and a second bottom fork portion of the right fork leg;
a first split coupler clamped onto first top fork portion;
a second split coupler clamped onto the second top fork portion; and
a steering handle bar coupled to the first and second split couplers, wherein
the left fork leg and the right fork leg each formed as a single monolithic structure between the wheel attachment portion and the first and second top fork portions.

12. The apparatus according to claim 11, wherein the top end portion of the left and right fork legs is positioned at least 50 mm in a vertical direction from the top end of the steering column.

13. The apparatus according to claim 11, wherein a bottom of the handle bar is positioned at least 20 mm from the top end of the steering column.

14. The apparatus according to claim 11, wherein:
the right and left fork legs penetrate a pair of upper and lower fork crowns; and
the steering column penetrates a center of the pair of upper and lower fork crowns.

15. The apparatus according to claim 11, wherein the steering handle bar is anchored directly above a top fork portion, without an offset to a front or to a rear from a center of the top fork portion of the left and right front forks.

16. The apparatus according to claim 11, wherein the first and second split couplers are anchored directly above the first and second top fork portions, without an offset to a left or to a right from a center of the top fork portion of the left and right front forks.

17. The apparatus according to claim 11, wherein each split coupler is integrally attached to a corresponding fork leg by welding, gluing or casting, and wherein the left and right fork legs pass through left and right penetration holes in the pair of upper and lower fork crowns.

18. The apparatus according to claim 11, wherein the steering handle bar comprises a flat bar.

19. The apparatus according to claim 11, wherein a shape of the left and right fork legs comprises a pair of straight and parallel lines.

20. An apparatus comprising:
a steering column pivotally supported by a head tube;
a left fork leg extending along a left side of the steering column and comprising a first top fork portion, a first middle fork portion and a first bottom fork portion;
a right fork leg extending along a right side of the steering column and comprising a second top fork portion, a second middle fork portion and a second bottom fork portion;
a first split coupler clamped onto first top fork portion;
a second split coupler clamped onto the second top fork portion; and
a steering handle bar clamped onto the first and second split couplers,
wherein a lateral spacing is maintained between the left fork leg and the right fork leg such that left fork leg does not contact the right fork leg, and
wherein the left fork leg and the right fork leg each formed as a single monolithic structure from the first and second bottom fork portions to the first and second top fork portions.

21. The apparatus according to claim 20, wherein the left and right fork legs extend vertically and substantially in parallel to each other.

* * * * *